(12) United States Patent
Chou

(10) Patent No.: US 8,892,856 B2
(45) Date of Patent: Nov. 18, 2014

(54) FIRMWARE FLASHING METHOD AND RELATED COMPUTER SYSTEM

(75) Inventor: Wei-Chen Chou, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 463 days.

(21) Appl. No.: 13/241,183

(22) Filed: Sep. 22, 2011

(65) Prior Publication Data

US 2012/0317404 A1    Dec. 13, 2012

(30) Foreign Application Priority Data

Jun. 13, 2011   (TW) .............................. 100120548 A

(51) Int. Cl.
*G06F 9/06*   (2006.01)
*G06F 9/445*   (2006.01)

(52) U.S. Cl.
CPC ...................................... *G06F 8/665* (2013.01)
USPC .................... 713/1; 713/2; 713/100; 711/103

(58) Field of Classification Search
USPC .................... 713/1, 2, 100; 711/103
See application file for complete search history.

(56) References Cited

U.S. PATENT DOCUMENTS 6,714,993 B1    3/2004   Bhaskaran
6,944,854 B2 *  9/2005   Kehne et al. .................. 717/168
7,073,051 B2 *  7/2006   Touchet ........................... 713/1
7,970,983 B2 *  6/2011   Nochimowski ............... 711/103
8,589,302 B2 * 11/2013   Prakash et al. .................. 705/50
2004/0255075 A1 * 12/2004   Huang et al. .................. 711/103

FOREIGN PATENT DOCUMENTS

TW    200736952       10/2007
WO    2007044947 A2    4/2007

OTHER PUBLICATIONS

Office action mailed on Nov. 13, 2013 for the Taiwan application No. 100120548, filed: Jun. 13, 2011, p. 1 line 14, p. 2-5, p. 6 line 1 and search report.
Office action mailed on May 30, 2014 for the Taiwan application No. 100120548, filing date: Jun. 13, 2011, p. 2 line 15~26 and p. 3 line 1~3

* cited by examiner

*Primary Examiner* — M Elamin
(74) *Attorney, Agent, or Firm* — Winston Hsu; Scott Margo

(57) ABSTRACT

A firmware flashing method for a computer system is disclosed. The firmware flashing method comprises establishing a list, wherein the list comprise a plurality of identities individually corresponding to a plurality of firmwares, checking a plurality devices of the computer system and obtaining corresponding identities of the plurality of devices of the computer system, determining whether the corresponding identities of the plurality of devices of the computer system exist in the list, selecting corresponding firmwares of the plurality of devices of the computer system when the corresponding identities of the plurality of devices of the computer system exist in the list, and merging the corresponding firmwares of the plurality of devices of the computer system and writing the corresponding firmwares of the plurality of devices of the computer system in a memory.

12 Claims, 4 Drawing Sheets

| Graphic card | Option-ROM |
|---|---|
| VGA1 GUID | VBIOS1 |
| VGA2 GUID | VBIOS2 |
| ⋮ | ⋮ |
| VGAn GUID | VBIOSn |

| Network card | Option-ROM |
|---|---|
| LAN1 GUID | PXE1 |
| LAN2 GUID | PXE2 |
| ⋮ | ⋮ |
| LANn GUID | PXEn |

| Device category | Address |
|---|---|
| Graphic card | 0x0000-0x1000 |
| Network card | 0x1000-0x2000 |
| BIOS code | 0x2000-0x4000 |

# FIRMWARE FLASHING METHOD AND RELATED COMPUTER SYSTEM

BACKGROUND OF THE INVENTION

1. Field of the Invention

The present invention relates to a firmware flashing method and related computer system, and more particularly, to a firmware flashing method and related computer system for solving lack of capacity of Flash-ROM.

2. Description of the Prior Art

In the information society nowadays, computer system has become part of human life, people relies on computer system to process documentary works or daily routines. When the computer is turned on, flashing memory of main board executes basic input output system (BIOS), and initializes chip set and memory subsystem. The BIOS includes function of diagnosis to ensure that some key hardware component, such as keyboard, disk devices, input port and output port etc, works properly and initialized correctly. The BIOS can selectively execute memory setting program, store data set by users, e.g. time, date, hard disk details, etc. In addition, the BIOS allows the user to select which device to start up the computer, e.g. optical disk device (ODD), hard disk, soft disk, USB disk, or allows the user to select which operating system to be loaded in the computer, e.g. load another operating system from a second hard disk.

Since the BIOS and the hardware system are merged together, the BIOS becomes larger and more complex. When new hardware is updated, the BIOS has to update accordingly to support the new hardware, therefore the BIOS is stored in EEPROM or Flash ROM to update the BIOS easily. The BIOS stores many different Option-ROMs in the EEPROM or the Flash ROM to drive special hardware devices, such as Video BIOS of graphic cards and PXE ROM of LAN, these option-ROMs increases data size of the BIOS. When a computer system supports graphic cards with different versions, or network cards different versions, the BIOS has to include all option-ROM of graphic cards supported by the computer system, e.g. Video BIOS and PXE ROM, at this moment, data for storing the option-ROM increases. But, the capacity of the Flash ROM is limited, it has to replace the Flash ROM with larger capacity if over capacity limitation. As a result, production cost may be increased.

SUMMARY OF THE INVENTION

It is therefore an object to provide a firmware flashing method and related computer system.

The present invention discloses a firmware flashing method for a computer system including establishing a list including a plurality of identities individually corresponding to a plurality of firmwares, checking a plurality devices of the computer system and obtaining corresponding identities of the plurality of devices of the computer system, determining whether the corresponding identities of the plurality devices of the computer system exist in the list according to the list, selecting corresponding firmwares of the plurality of devices of the computer system when the corresponding identities of the plurality of devices of the computer system exist in the list, and merging the corresponding firmwares of the plurality of devices of the computer system and writing the corresponding firmwares of the plurality of devices of the computer system in a memory.

The present invention further discloses a computer system including a main board for supporting a plurality of devices driven by a plurality of firmwares, a basic input output system for establishing a list, wherein the list comprises a plurality of identities individually corresponding to the plurality of firmwares, and an applying unit including a detecting unit for checking the plurality of devices and obtaining the corresponding identities of the plurality of devices, a determining unit for determining whether the corresponding identities of the plurality of devices exist in the list according to the list, a selecting unit for selecting the firmwares of the plurality of devices when the corresponding identities of the plurality of devices exist in the list, and a merging unit for merging the firmwares of the plurality of devices and writing the firmwares of the plurality of devices of the computer system in a memory.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
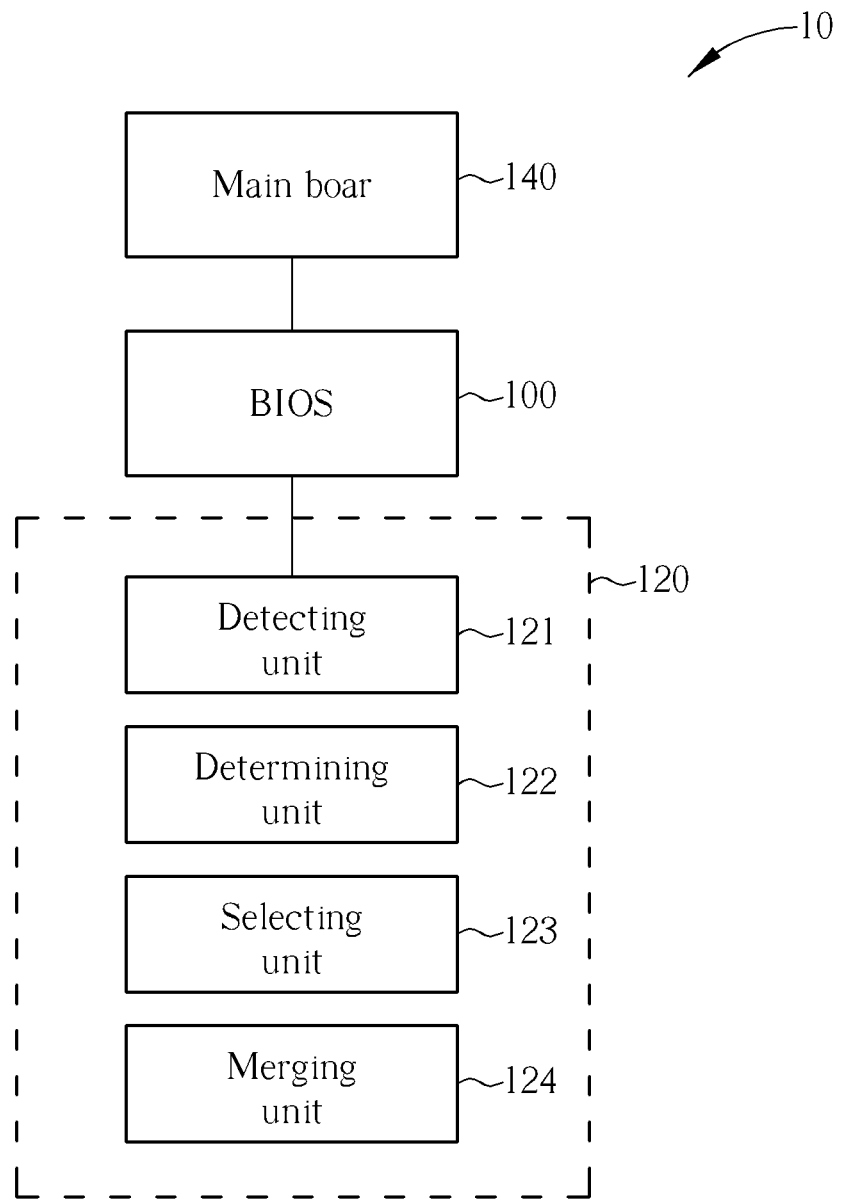
FIG. 1 is a schematic diagram of a computer system according to an embodiment of the present invention.

Please refer to FIG. 1, which is a schematic diagram of a computer system 10 according to an embodiment of the present invention. The computer system 10 can be a laptop supporting devices, e.g. graphic cards or network cards, in different versions and includes a main board 140, a basic input output system (BIOS) 100 and an applying unit 120. The main board 140 supports a plurality of devices, such as optical disk device (ODD), hard disk, soft disk, USB disk, graphic card, and network card, etc. And each device corresponds to a computer unique identifier. The computer unique identifier can be a globally unique identifier (GUID), which is an integer of 128 bits, i.e. 16 bytes, for all computers and networks supporting unique identifiers. Each device is driven by a corresponding option-ROM. The option-ROM is stored in a flash-ROM of the BIOS 100. The BIOS 100 is used for establishing a list, which includes the computer unique identifiers and the corresponding option-ROMs of the devices in different versions. In other words, the list lists the option-ROMs and the computer unique identifiers for devices in different versions. In addition, the BIOS 100 can further establish an address column for preserving the plurality addresses in the Flash-ROM, each address corresponds to one device category. That is, devices in different versions only correspond to a single device category, and only one address is preserved in the Flash-ROM. The applying unit 120 includes a detecting unit 121, a determining unit 122, a selecting unit 123 and a merging unit 124. The detecting unit 121 is used for checking the plurality of devices in the computer system 10, and obtaining the corresponding identities of the plurality of devices. The determining unit 122 is used for determining whether the corresponding identities of the plurality of devices exist in the list according to list. The selecting unit 123 is used for selecting firmwares of the plurality of devices when the corresponding identities of the plurality of devices exist in the list. The merging unit 124 is used for merging the firmwares of the plurality of devices, and writing the firmwares of the plurality of devices in the Flash-ROM.

In short, the BIOS 100 establishes a list to list the computer unique identifiers and the corresponding option-ROMs of the devices in different versions. Meanwhile, the BIOS 100 preserves addresses for the computer unique identifiers corresponding to the devices of the computer system 10 in the Flash-ROM. That is, when each device has more than one version, only one address is preserved for each device category in the Flash-ROM. For example, the computer system 10 supports a network card in two versions and a graphic card in two versions, the applying unit 120 preserves addresses for the network card and the graphic card, respectively. When the computer system starts flashing, the applying unit 120 obtains the computer unique identifiers corresponding to the devices of the computer system 10 from the main board 140, and compares whether the computer unique identifiers of the computer system 10 is same as the computer unique identifiers on the list. When the computer unique identifiers of the computer system 100 exist in the list, the applying unit 120 selects the corresponding option-ROM, and merges the corresponding option-ROM and writes in the Flash-ROM of the BIOS 100. Comparing with the prior art, when flashing the option-ROM, only one option-ROM of each device category is written in the Flash-ROM of the BIOS 100, so as to avoid the Flash-ROM storing the option-ROMs corresponding to all versions of the device. As a result, unnecessary capacity waste of the Flash-ROM can be avoided, and further to control cost of production.

Besides, when the corresponding computer unique identifiers of the computer system 100 do not exist in the list, the applying unit 120 obtains the corresponding identities of computer system 100 again.

Figure 2:
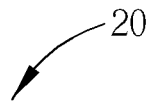
FIG. 2 is a schematic diagram of a list according to an embodiment of the present invention.
Figure 3:
FIG. 3 is a schematic diagram of a table according to an embodiment of the present invention.

Please refer to FIG. 2, which is a schematic diagram of a list 20 according to an embodiment of the present invention. The list 20 lists a graphic card in different versions and their corresponding option-ROMs, and a network card in different versions and their corresponding option-ROMs. In FIG. 2, the graphic card in different versions has computer unique identifiers VGA1 GUID, VGA2 GUID, VGA3 GUID, . . . , VGAn GUID, which individually corresponds to option-ROM VBIOS1, VBIOS2, VBIOS3, . . . , VBIOSn. The network card in different versions has the computer unique identifier LAN1 GUID, LAN2 GUID, LAN3 GUID, . . . , LANn GUID, which individually corresponds to option-ROMs PXE1, PXE2, PXE3, . . . , PXEn. Please refer to FIG. 3, which is a schematic diagram of a table 30 according to an embodiment of the present invention. The table 30 preserves three addresses for the graphic card category, the network card category and the BIOS code category, respectively. For example, for a graphic card in n versions, and thus having n option-ROMs, the present invention only preserves one address for those option-ROMs. In FIG. 3, address 0x0000-0x1000 is preserved for the graphic card category, address 0x1000-0x2000 is preserved for the network card category, and address 0x2000-0x4000 is preserved for the BIOS code category. Take FIG. 2 and FIG. 3 as an example, the BIOS 100 can establish the list 20 to list the graphic card in different versions and their corresponding option-ROMs as well as the network card in different versions and their corresponding option-ROMs. Then, the BIOS 100 can establish the table 30 to preserve the plurality of addresses for each device category. The applying unit 120 can start flashing procedure to check the main board 140 of the computer system 100, obtaining the option-ROMs in the computer system 100. Assuming that the computer unique identifier of the graphic card used by the computer system 100 is the VGA2 GUID, and the computer unique identifier of the network card is the LAN3 GUID, therefore, the applying unit 120 determines whether the computer unique identifiers VGA2 GUID and LAN3 GUID exist in the list 20 according to the list 20. when the applying unit 120 determines the computer unique identifiers VGA2 GUID and LAN3 GUID exist in the list 20, the applying unit 120 selects the option-ROMs VBIOS2 and PXE3 corresponding to the computer unique identifiers VGA2 GUID and LAN3 GUID. And then, the applying unit 120 merges the option-ROMs VBIOS2 and PXE3 according to the table 30, so as to obtain a complete ROM file. At last, the applying unit 120 writes the merged ROM file, including VBIOS2 and PXE3, into the Flash-ROM. As a result, the Flash-ROM does not store the option-ROM with all versions, and thus reduce unnecessary capacity waste of the Flash-ROM.

Figure 4:
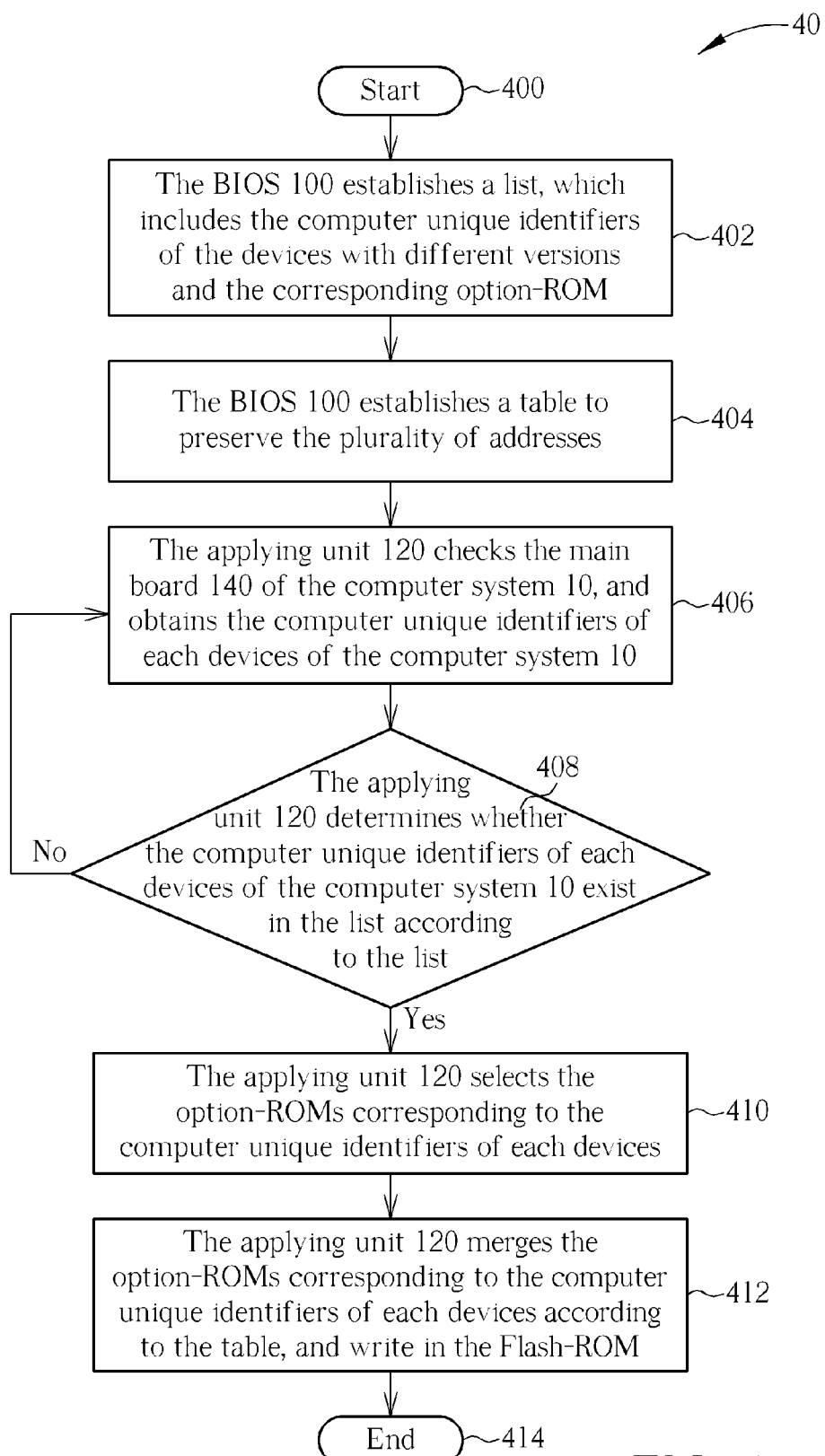
FIG. 4 is a schematic diagram of a process according to an embodiment of the present invention.

Operations of the computer system 10 can be further summarized into a process 40 as shown in FIG. 4. The process 40 is used for executing firmware flashing in the electronic devices 10, and including the following steps:

Step 400: start.

Step 402: The BIOS 100 establishes a list, which includes the computer unique identifiers of the devices with different versions and the corresponding option-ROM.

Step 404: The BIOS 100 establishes a table to preserve the plurality of addresses.

Step 406: The applying unit 120 checks the main board 140 of the computer system 10, and obtains the computer unique identifiers of each devices of the computer system 10.

Step 408: The applying unit 120 determines whether the computer unique identifiers of each devices of the computer system 10 exist in the list according to the list, if yes, executes step 410, if not, execute step 406.

Step 410: The applying unit 120 selects the option-ROMs corresponding to the computer unique identifiers of each devices.

Step 412: The applying unit 120 merges the option-ROMs corresponding to the computer unique identifiers of each devices according to the table, and write in the Flash-ROM.

Step 414: End.

The process 40 is operations of the computer system 10, details of the computer system 10 can be derived by referring to the above description.

To sum up, the BIOS establishes a list including the computer unique identifiers of the devices with different versions and the corresponding option-ROMs. The applying unit checks the devices of the computer system according to the list, and writes the corresponding option-ROMs in the Flash-ROM, and not writes the devices not supported by the computer system option-ROM in the Flash-ROM As a result, the Flash-ROM does not store the option-ROM with all versions, and thus reduce unnecessary capacity waste of the Flash-ROM.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A firmware flashing method for a computer system, comprising:

a processing of the computer system executing a program code to establish a list, wherein the list comprises a plurality of identities individually corresponding to a plurality of firmwares, wherein each identity corresponds to only one firmware version of each firmware;

the processing of the computer system executing a program code to check a plurality of devices of the computer system and obtaining corresponding identities of the plurality of devices of the computer system;

the processing of the computer system executing a program code to determine whether the corresponding identities of the plurality devices of the computer system exist in the list according to the list;

the processing of the computer system executing a program code to select corresponding firmwares of the plurality of devices of the computer system when the corresponding identities of the plurality of devices of the computer system exist in the list;

the processing of the computer system executing a program code to merge the corresponding firmwares of the plurality of devices of the computer system and writing the merged firmwares in a memory; and the processing of the computer system executing a program code to preserve a plurality of addresses in the memory, wherein the plurality of addresses individually correspond to a plurality of device categories, and only one firmware version for each device category is written in only one address in the memory.

2. The method of claim 1, further comprising the processing of the mobile device executing a program code to obtain the corresponding identities of the plurality of devices of the computer system again when the corresponding identities of the plurality devices of the computer system exist in the list.

3. The method of claim 1, further comprising the processing of the mobile device executing a program code to execute a firmware flashing procedure.

4. The method of claim 1, wherein the firmware is an Option-ROM.

5. The method of claim 1, wherein the memory is a Flash-ROM.

6. The method of claim 1, wherein the identity is a globally unique identifier (GUID).

7. A computer system, comprising:
a main board for supporting a plurality of devices driven by a plurality of firmwares;
a basic input output system (BIOS) for establishing a list, wherein the list comprises a plurality of identities individually corresponding to the plurality of firmwares, wherein each identity corresponds to only one firmware version of each firmware; and
an applying unit, comprising:
a detecting unit for checking the plurality of devices and obtaining the corresponding identities of the plurality of devices;
a determining unit for determining whether the corresponding identities of the plurality of devices exist in the list according to the list;
a selecting unit for selecting the firmwares of the plurality of devices when the corresponding identities of the plurality of devices exist in the list;
a merging unit for merging the firmwares of the plurality of devices and writing the merged firmwares in a memory; and
a plurality of preserved addresses in the memory, wherein the plurality of preserved addresses individually correspond to a plurality of device categories, and only one firmware version for each device category is written in only one preserved address in the memory.

8. The computer system of claim 7, wherein the detecting unit is further used for obtaining the corresponding identities of the plurality of devices again when the corresponding identities of the plurality of devices exist in the list.

9. The computer system of claim 7, further comprising a flashing unit for executing a firmware flashing procedure.

10. The computer system of claim 7, wherein the firmware is an Option-ROM.

11. The computer system of claim 7, wherein the memory is a Flash-ROM.

12. The computer system of claim 7, wherein the identity is a globally unique identifier (GUID).

* * * * *